United States Patent
Lundberg

(10) Patent No.: US 11,086,886 B2
(45) Date of Patent: Aug. 10, 2021

(54) SYSTEMS, METHODS AND USER INTERFACES IN A PATENT MANAGEMENT SYSTEM

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 181 days.

(21) Appl. No.: 15/912,553

(22) Filed: Mar. 5, 2018

(65) Prior Publication Data

US 2018/0329912 A1   Nov. 15, 2018

Related U.S. Application Data

(63) Continuation of application No. 13/309,060, filed on Dec. 1, 2011, now Pat. No. 9,940,363.
(Continued)

(51) Int. Cl.
*G06F 16/2457* (2019.01)
*G06F 16/26* (2019.01)
(Continued)

(52) U.S. Cl.
CPC ...... *G06F 16/24578* (2019.01); *G06F 16/248* (2019.01); *G06F 16/2455* (2019.01);
(Continued)

(58) Field of Classification Search
CPC ................................................ G06F 16/24578
(Continued)

(56) References Cited

U.S. PATENT DOCUMENTS

| 4,807,154 A | 2/1989 | Scully et al. |
| 5,329,447 A | 7/1994 | Leedom, Jr. |

(Continued)

FOREIGN PATENT DOCUMENTS

| GB | 2156112 A | 10/1985 |
| WO | WO-02/080039 A1 | 10/2002 |

OTHER PUBLICATIONS

"U.S. Appl. No. 13/309,060, Advisory Action dated Apr. 18, 2014", 3 pgs.
(Continued)

*Primary Examiner* — Sheree N Brown
(74) *Attorney, Agent, or Firm* — Schwegman Lundberg & Woessner, P.A.

(57) ABSTRACT

A user-interface system is provided for a patent management system having access to at least one patent matter database and at least one reference database. The user interface system comprises a first user interface element allowing selection of data stored in the at least one patent matter database, a second user interface element allowing selection of data stored in the at least one reference database, a third user interface element for linking at least one reference stored in the at least one reference database with at least one patent in the patent matter database, a fourth user interface element allowing the selection for storage of further references into the at least one reference database, and a fifth user interface element allowing analysis of at least one of the linked references.

21 Claims, 6 Drawing Sheets

Related U.S. Application Data

(60) Provisional application No. 61/561,502, filed on Nov. 18, 2011, provisional application No. 61/542,515, filed on Oct. 3, 2011.

(51) Int. Cl.
| | |
|---|---|
| *G06F 16/93* | (2019.01) |
| *G06F 16/248* | (2019.01) |
| *G06F 16/25* | (2019.01) |
| *G06F 16/2455* | (2019.01) |
| *G06F 16/9535* | (2019.01) |
| *G06Q 10/10* | (2012.01) |
| *G06F 40/237* | (2020.01) |
| *G06Q 50/18* | (2012.01) |

(52) U.S. Cl.
CPC ............ *G06F 16/252* (2019.01); *G06F 16/26* (2019.01); *G06F 16/93* (2019.01); *G06F 16/9535* (2019.01); *G06F 40/237* (2020.01); *G06Q 10/10* (2013.01); *G06Q 50/184* (2013.01); *G06F 2216/11* (2013.01)

(58) Field of Classification Search
USPC ......................................................... 707/792
See application file for complete search history.

(56) References Cited

U.S. PATENT DOCUMENTS

| | | | |
|---|---|---|---|
| 5,410,646 A | 4/1995 | Tondevold et al. | |
| 5,530,852 A | 6/1996 | Meske et al. | |
| 5,548,506 A | 8/1996 | Srinivasan | |
| 5,548,753 A | 8/1996 | Linstead et al. | |
| 5,557,515 A | 9/1996 | Abbruzzese et al. | |
| 5,592,664 A | 1/1997 | Starkey | |
| 5,659,729 A | 8/1997 | Nielsen | |
| 5,664,063 A | 9/1997 | Johnson et al. | |
| 5,664,714 A | 9/1997 | Navarro et al. | |
| 5,699,528 A | 12/1997 | Hogan | |
| 5,758,328 A | 5/1998 | Giovannoli | |
| 5,850,520 A | 12/1998 | Griebenow et al. | |
| 5,870,745 A | 2/1999 | McCune | |
| 5,895,468 A | 4/1999 | Whitmyer, Jr. | |
| 5,903,881 A | 5/1999 | Schrader et al. | |
| 5,907,837 A | 5/1999 | Ferrel et al. | |
| 6,049,801 A | 4/2000 | Whitmyer, Jr. | |
| 6,182,078 B1 | 1/2001 | Whitmyer, Jr. | |
| 6,879,990 B1* | 4/2005 | Boyer ..................... | G06Q 10/10 705/310 |
| 6,970,842 B1 | 11/2005 | Ashby | |
| 6,981,007 B1 | 12/2005 | Whitmyer, Jr. | |
| 8,126,818 B2* | 2/2012 | Rhoads ................ | G06Q 50/184 705/310 |
| 9,710,786 B2* | 7/2017 | Rhoads .................. | G06Q 10/10 |
| 9,760,961 B2* | 9/2017 | Steensgard ........... | G06F 16/955 |
| 9,940,363 B2 | 4/2018 | Lundberg | |
| 10,832,212 B2* | 11/2020 | Rhoads .................. | G06Q 50/18 |
| 2002/0065677 A1 | 5/2002 | Grainger et al. | |
| 2002/0161733 A1* | 10/2002 | Grainger ............. | G06Q 10/109 706/45 |
| 2003/0167181 A1 | 9/2003 | Lundberg et al. | |
| 2005/0246194 A1 | 11/2005 | Lundberg | |
| 2006/0173920 A1 | 8/2006 | Adler et al. | |
| 2006/0190449 A1 | 8/2006 | Lundberg et al. | |
| 2007/0288256 A1 | 12/2007 | Speier | |
| 2008/0140523 A1* | 6/2008 | Mahoney ........... | G06Q 30/0256 705/14.54 |
| 2009/0157717 A1 | 6/2009 | Palahnuk et al. | |
| 2010/0180223 A1* | 7/2010 | Speier ..................... | G06F 16/34 715/771 |
| 2011/0320582 A1 | 12/2011 | Lewis | |
| 2013/0086117 A1 | 4/2013 | Lundberg | |
| 2013/0282409 A1 | 10/2013 | Lundberg et al. | |
| 2013/0282571 A1 | 10/2013 | Lundberg | |
| 2013/0346116 A1 | 12/2013 | Lundberg | |
| 2013/0346265 A1 | 12/2013 | Lundberg | |
| 2013/0346323 A1 | 12/2013 | Lundberg | |
| 2013/0346505 A1 | 12/2013 | Lundberg | |

OTHER PUBLICATIONS

"U.S. Appl. No. 13/309,060, Appeal Brief filed Apr. 21, 2015", 16 pgs.
"U.S. Appl. No. 13/309,060, Appeal Decision dated Aug. 25, 2017", 9 pgs.
"U.S. Appl. No. 13/309,060, Final Office Action dated Oct. 11, 2013", 13 pgs.
"U.S. Appl. No. 13/309,060, Final Office Action dated Nov. 28, 2014", 13 pgs.
"U.S. Appl. No. 13/309,060, Final Office Action dated Dec. 7, 2012", 10 pgs.
"U.S. Appl. No. 13/309,060, Non-Final Office Action dated May 30, 2013", 11 pgs.
"U.S. Appl. No. 13/309,060, Non-Final Office Action dated Jun. 17, 2014", 12 pgs.
"U.S. Appl. No. 13/309,060, Non-Final Office Action dated Aug. 1, 2012", 8 pgs.
"U.S. Appl. No. 13/309,060, Notice of Allowance dated Nov. 27, 2017", 7 pgs.
"U.S. Appl. No. 13/309,060, Response filed Mar. 4, 2014 to Final Office Action dated Dec. 24, 2013", 11 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non-Final Office Action dated May 30, 2013", 10 pgs.
"U.S. Appl. No. 13/309,060, Response filed Sep. 20, 2012 to Non-Final Office Action dated Aug. 1, 2012", 8 pgs.
"U.S. Appl. No. 13/309,060, Response filed Nov. 17, 2014 to Non-Final Office Action dated Jun. 17, 2014", 6 pgs.
"U.S. Appl. No. 13/573,803, Non-Final Office Action dated Sep. 15, 2014", 15 pgs.
"U.S. Appl. No. 13/573,803, Non- Final Office Action dated Dec. 5, 2013", 16 pgs.
"U.S. Appl. No. 13/573,803, Response filed Jun. 5, 2014 to Non-Final Office Action dated Dec. 5, 2013", 12 pgs.
"U.S. Appl. No. 13/573,804, Non-Final Office Action dated Oct. 20, 2014", 15 pgs.
"U.S. Appl. No. 13/573,804, Response filed Aug. 29, 2014 to Restriction Requirement dated Jun. 30, 2014", 8 pgs.
"U.S. Appl. No. 13/573,804, Restriction Requirement dated Jun. 30, 2014", 5 pgs.
U.S. Appl. No. 14/010,400, filed Aug. 26, 2013, Patent Troll Monitor.

* cited by examiner

SYSTEMS, METHODS AND USER INTERFACES IN A PATENT MANAGEMENT SYSTEM

RELATED APPLICATIONS

This application is a continuation of and claims the benefit of priority under 35 U.S.C. § 120 to U.S. patent application Ser. No. 13/309,060, filed on Dec. 1, 2011, which claims the benefit under 35 U.S.C. 119(e) of U.S. Provisional Patent Application Ser. No. 61/542,515 filed Oct. 3, 2011, which is incorporated herein by reference in its entirety and made a part hereof. Prior U.S. patent application Ser. No. 13/309,060 also claims the benefit under 35 U.S.C. 119(e) of U.S. Provisional Patent Application Ser. No. 61/561,502 filed Nov. 18, 2011, which is incorporated herein by reference in its entirety and made a part hereof.

BACKGROUND

The management of a patent portfolio involves multiple stages. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force.

BRIEF DESCRIPTION OF DRAWINGS

Some embodiments are illustrated by way of example and not limitation in the figures of the accompanying drawings in which.

DETAILED DESCRIPTION

Figure 1:
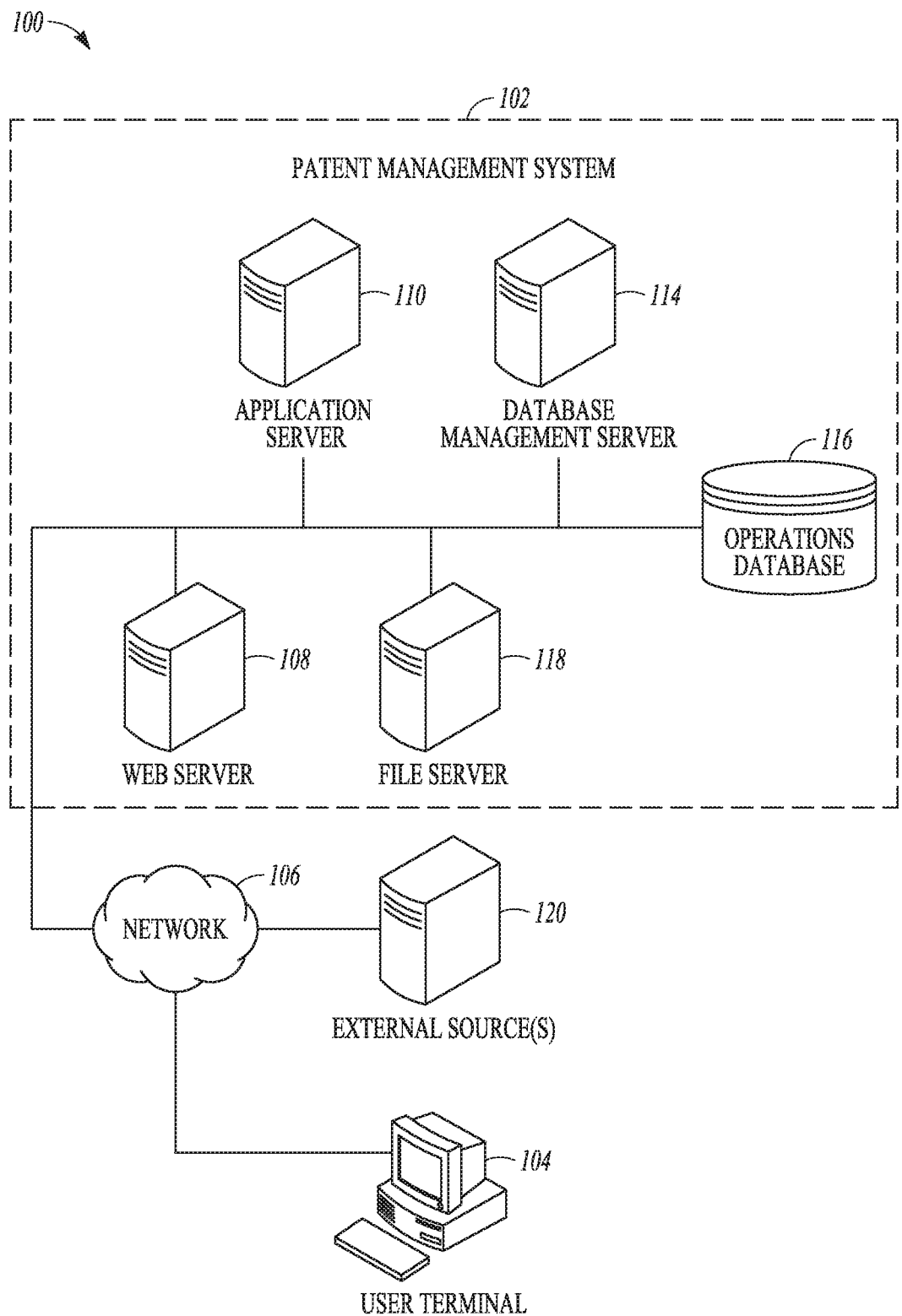
FIG. 1 is a system component diagram, according to an example embodiment.

The life cycle of a patent may include multiple stages. These stages generally include invention, filing a patent application on the invention, prosecuting the patenting application to allowance or abandonment, determining whether to file any continuing applications, and paying maintenance fees on the allowed patent.

At each stage, one or more parties determine the best course of action to take with respect to the invention. For example, when determining whether or not to file a patent, the inventor may know what products are out in the technology area of the invention, a business manager may know how the invention fits in with a company's goals, and a patent attorney may have researched existing patents or application in the technology area of the patent. These parties will ultimately make the decision whether it is worth the initial investment of filing an application on the invention and then determine the next course of action at each future stage.

In some instances, an inventor, business manager or portfolio manager may wish to monitor the patent activities of one or more competitors. The provision of up-to-date information relating to cited references or technology trends in the art to which a user's or competitor's patent portfolio relates may be particularly helpful in devising patenting strategy or making informed business decisions.

In various embodiments, a patent management system includes tools to help the parties involved in the patenting process make decisions at each stage in the life of a patent. These tools may also be used for general research by parties not immediately involved with the patenting of the invention. Additionally, these tools may be used as standalone tools, in combination with other tools, and in combination with other patent management systems. The tools may be used to provide patent analytics information. The tools may also be used to facilitate prosecution of a patent matter, by assisting in extracting and automatically analyzing data from external patent databases, for example. In an example embodiment, tools and systems are provided for a patent management system known as "PAIR Plus".

Examples of tools include, but are not limited to prosecution analytics, reference management, prior art analytics, docketing management, claim mapping, claim analytics, portfolio analytics, external database (e.g., PAIR) analytics, annuity management, and strategic monitoring. The systems, methods and tools of the present invention set forth in this specification are described in relation to a patent management system and patent matters, but it will be understood that the present invention could equally be applied to other forms of intellectual property (trademarks, copyright, registered designs, and the like). Moreover, the term "patent" is not intended to be limited to an issued patent, but may include a pending patent application or un-filed application or invention disclosure. The term "user" is intended to cover any person interacting with the patent management system. A user may be an inventor, portfolio manager, business manager or patent attorney, for example.

FIG. 1 is a schematic view of computer network system 100 according to various embodiments. The computer network system 100 includes patent management system 102 and user terminal 104 communicatively coupled via network 106. In an embodiment, patent management system 102 includes web server 108, application server 110, and database management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the tools of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic, Scripting Edition), JavaScript™, XML, (Extensible Markup Language), XSLT™ (Extensible Stylesheet Language Transformations), AJAX (Asynchronous JavaScript and XML). Java™, JFC (Java™ Foundation Classes), and Swing (an Application Programming Interface for Java™).

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a matter database a portfolio database, a user database, a mapping database and an analytics database. Operations database 116 may be implemented as a relational database, a centralized database, a distributed database, an object oriented database, or a flat database in various embodiments.

In various embodiments, the tools of the patent management system share a common framework. The framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number. One or more matters may) be associated with prior art or cited references stored in a reference or prior art database.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes and other structures, names, or formats may be used. Additionally, further associations between data stored in the databases may be created as discussed further herein.

During operation of patent management system 102, data from multiple data sources (internal and external) is imported into or accessed by the operations database 116. Internal sources may include data from the various tools of the patent management system. External sources 120 may include websites or databases associated with foreign and domestic patent offices, assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 2:
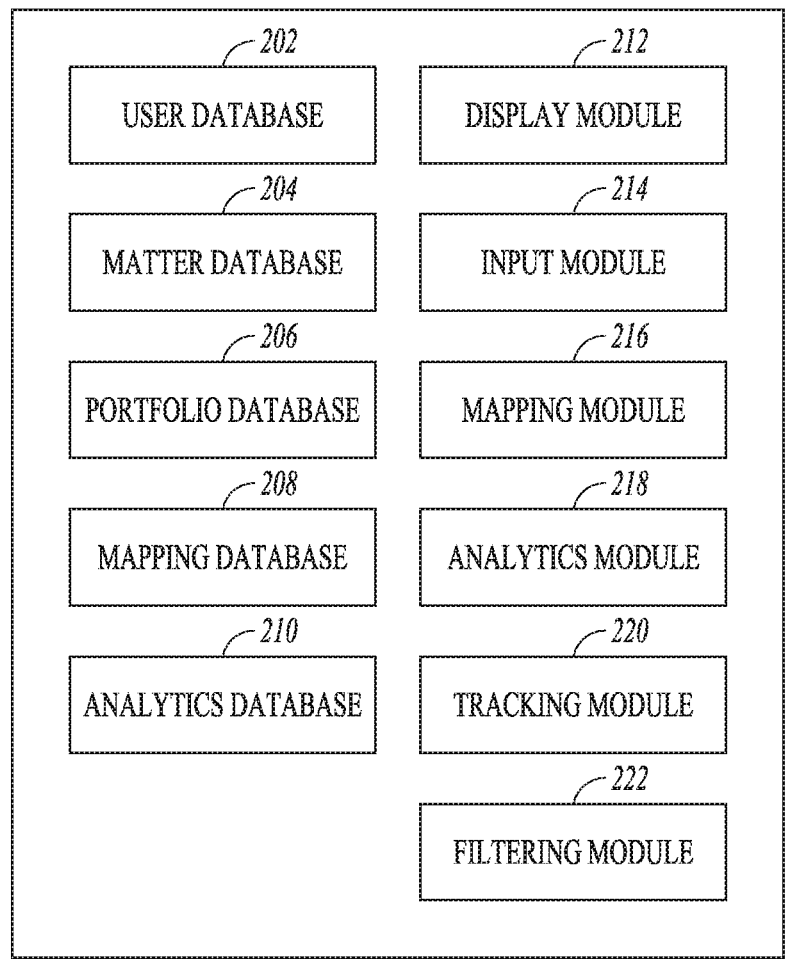
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, tracking module 220 and filtering module 222. In various embodiments, the data stored in databases 202, 204, 206, 208, and 210 may be in the same or multiple physical locations. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212-222 may be executed across multiple computer systems.

In an example embodiment user database 202 stores data representing users of patent management system 102. The data may include data fields of user credentials including a user ID and password and access rights with respect to patent management system 102. The user ID may be common across the tools of the patent management system. In this manner, access rights of the user with respect to the tools of the patent management system may follow across the various tools of the patent management system. In an example embodiment, different access rights are granted to a user ID between the various tools.

In various embodiments, each user ID has access rights to one or more matters. Similarly, a user ID may have portfolio level access rights. Access rights may be defined according to at least two parameters: read access and write access. Thus, when a user logs into patent management system 102, the user is presented with access only to the matters/portfolios that have been associated with the user ID. More (e.g., additional contact information) or fewer data fields associated with a user may be included in a user entry stored in user database 202.

In an embodiment, matter database 204 stores data representing matters. Each matter may be associated with one or more portfolios. In some embodiments, a matter is associated with no portfolios. In various embodiments, a matter is a foreign or domestic patent or application. Matters may also be inventions that have not yet been filed (e.g., as may be the case within a docketing system). In an embodiment, a matter entry includes data fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due). In some embodiments, other patent reference documents or prior art in any form may be stored and associated with one or more matters. More or fewer data fields associated with a patent may be included in a matter entry stored in matter database 204. In an example embodiment, matter database 204 may store a patent matter database, wherein this database includes data about the patent matters. The data may include, for at least one patent matter, a claim set or statement of invention and a priority date for the claim set or statement of invention. Matter database 204 may also store a database of prior art documents (also known as "references"), wherein the prior art database includes data about the prior art documents. The data may include, for at least one prior art document, a priority date or publication date of the document. One or more of the prior art documents may be associated with a first patent matter in the patent matter database. Matter database 204 may also store data obtained from internal or external sources relating to cited references owned by or cited against (in "forward" or "reverse" manner) a target entity (for example, a client of a firm) as well as cited references owned by or cited against (in "forward" or "reverse" manner) another entity (for example, a competitor of the client or other target entity). Public bibliographic details of such cited references may be obtainable from websites or databases associated with foreign and domestic patent offices (PAIR), assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated by a tool of patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 206.

In various embodiments, mapping database 208 may include mappings of patent concepts to one or more matters. In an example embodiment, the underlying patents and patent claims included in each patent portfolio may be categorized by patent concepts (sometimes referred herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is contrast to technology categories, where the claim may be mapped to a TC but it not necessarily limited to it. A scope concept may be defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical concepts in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc, may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful is disqualify claims that are not of interest to a particular target (e.g., if an analysis is being done to find a claim that covers an alleged infringer).

In some example embodiments, specific scope concepts are mapped patent by patent or by patent family. These may enable a person to create one or two scope concepts that can be mapped across all claims in given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family. A keyword mapping may indicate that there is an exact match between the keyword and a subset of the claim language.

In various embodiments, analytics database 210 stores data representing calculated analytics on data stored within patent management system 102 or external data sources. In various embodiments, analytics are organized according to an individual matter, a portfolio, or family, or date of an event (such as an assignment recordal, for example). Events may be organized by a date range (for example, all assignments occurring between Corporation A and Corporation B in the last 6 months, or all filings made by inventor X in last 12 months). The calculated analytics may be based on information gathered from multiple sources such as databases of patent management system 102 and PAIR.

In various embodiments, information for an individual matter may include status (e.g., disclosure received, drafting, filed, completed-waiting examination, in prosecution, allowed, issued), cited prior art, list and type of rejections (e.g., 35 U.S.C. § 101, 102, 103) number of claims allowed, office action count, interviews held, IDS statements filed, attorney fees to date, and PTO fees to date. Further metrics for an individual matter stored in analytics database 210 may include, time waiting for examiner, total time in examination, time waiting for PTO while in examination, and time on appeal. Additional prosecution details may include an upcoming docket date (e.g., due dates for office action, IDS due dates, etc.). A claim prosecution history chart may also be stored in analytics database 210 for each matter. The prosecution history may include a history of claim amendments and arguments made in prosecution.

In various embodiments, portfolio and family analytics information may be stored in analytics database 210 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between current metrics and metrics from a year ago (or other time period).

Aggregated metrics may include a total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country. An age distribution of the portfolio may also be compiled. For example the portfolio may be broken down by less than one year old, 1 to 3 years old. 3 to 5 years old, 5 to 10 years old, 10 to 20 years old, and 20 or more years old. Recent filing and issue activity as well as upcoming Ford filing deadlines may be stored in analytics database 210.

In various embodiments, prosecution metrics across a portfolio or family are determined and stored in analytics database 210. This data may include matters waiting for examination, matters in examination, matters appealed, and cases allowed but not yet issued. Analytics with respect office actions may also be compiled and stored. For example success of allowance after a first office action response, a second response, and so forth may be stored in analytics database 210. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of recently allowed cases, recently appealed cases, stalled cases, and recently abandoned cases may also be stored for each portfolio and family in analytics database 210.

In various embodiments, the results of keyword analysis on one or more matters and/or prior art references may be stored in analytics database 210. The keyword analysis may be based on the occurrences of the keywords in the matter or references to derive a score or keyword overlap.

In various embodiments, data stored in the database for a group of matters in a portfolio or family is analyzed to determine the top (e.g., ten) most cited patents, the top most cited inventors, top most cited prior art owners (e.g., according to assignment documents or the face of the patent), newly (e.g., within the last 60 days) cited prior art owners, and top most cited prior art inventors. This information may be stored in analytics database 210.

In an embodiment, display module 212 is configured to display user interfaces and information retrieved from one or more databases 202-210. If a user is accessing patent management system 102 remotely (e.g., through a web browser) display module 212 may be configured to transmit data representing a user-interface through a network to a user terminal. In various embodiments, display module 212 is configured to generate one or more charts of data stored in databases 202-210. For example, display module 212 may generate a pie chart of the top 10 inventors within a portfolio.

In various embodiments, input module 214 receives data from multiple sources where it may be further processed by one or more other modules and stored in one or more of databases 202-210. In various embodiments, input module 214 or the patent management system 102 may comprise a search engine (not shown) for conducting searches at a patent registry or on the Internet. For example, input module 214 may be configured to utilize one or more APIs to data from one or more patent data stores (e.g., public PAIR, private PAIR, INPADOC, foreign patent offices, patent docketing systems, portfolio management systems, etc). The data may include published patent documents, patent applications, office actions or other patent office correspondence, prior art references, claim mappings, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example patent management system 102 may present multiple user interfaces to a user. These user interfaces may enable users to input data directly into databases 202-210, instruct the patent management system to retrieve data from patent data stores, and instruct the patent management system to perform various operations (e.g., analysis) on the data in databases 202-210.

Additionally, input module 214 may be configured to determine the selection of one or more user interface elements by a user and initiate the action associated with the selected user interface element. For example, a user interface element may include a drop-down menu to select a portfolio. Input module 214 may be configured to receive the selection of the portfolio by the user. Then, input module 214 may pass the selection to one or more other modules for further processing. For example, display module 212 may update the drop-down menu to indicate the selection of the portfolio. In other example embodiments, a user may select an assignee name, or technology field, or date range of potential interest (or a combination of these or other aspects of interest), for which the user wishes to be informed of recent or ongoing assignment or change in ownership status. The user may request to be informed regularly (daily, weekly or monthly, for example) of ongoing assignments or changes in ownership by making a selection of the appropriate interface elements.

In various embodiments, input module 214 processes the data that has been inputted and formats it according to the data fields of databases 202-210 as discussed above. In various embodiments processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). A user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments the parsing module may parse multiple pieces of information before generating a database entry. For example, input module 214 may receive a docket number for an issued patent. The docket number may be combined with the information parsed from the issued patent to form an entry in matter database 204.

In various embodiments, mapping module 216 is configured to facilitate mappings of scope concept, technology categories, prior art and keywords to patent claims of a matter. In an embodiment, mapping signifies association. For example, in conjunction with display module 212 and input module 214, mapping module 216 may present a user interface of patent claims stored in matter database 204 and scope concepts stored in mapping database 208. Input module 214 may receive a selection of one or more patent claims and one or more scope concepts and pass them to mapping module 216. Mapping module 216 may then formulate an SQL query to associate the one or more patents claims with the one or more scope concepts. When executed, the SQL query, may update the mapping database 208 with the associations. In various embodiments, mapping module 216 also allows the creation of new scope concepts, technology categories, and keywords that may be mapped to one or more patent claims. Furthermore, mapping module may present user interfaces that allow a user to rank and rate matters stored in matter database 204.

Mapping module 216 may also allow the generation of claim charts of a plurality of cells. A claim chart may include one or more scope concepts, technology categories, and keywords on one axis and claims of matters in a portfolio on the other axis. The claim chart may include a variety of levels of granularity of scope concepts. Some claims may be mapped to all of the scope concepts while others may not be mapped to any scope concepts. At the cell intersection between a scope concept (or technology category or keyword) and a claim an indication of the mapping may be presented by changing the format of the cell. For example, the cell may be colored blue when a scope concept is mapped and red when not mapped.

In various embodiments, analytics module 218 is configured to examine and run calculations on the data stored in the databases 202-210 to generate the analytics previously discussed. For example, analytics module 218 may formulate an SQL query that retrieves the number of times that a prior art reference has been cited within a portfolio. This query may be run for each prior art cited within the portfolio to determine a list of the most cited (e.g., the top ten) prior art references with a portfolio. In an embodiment, the queries are formulated and run as requested by a user. In an embodiment, once the analytics information has been determined, it is stored within analytics database 210. In various embodiments, queries are formulated and run on a periodic basis (e.g., nightly) and entries in analytics database 210 may be updated to reflect any changes. In other embodiments, the analytics module 218 may in response to user input formulate a query to examine how many times a given patent matter has been assigned or been subject to a change in ownership from one party to another. Other queries analyzing patent assignment data may be run as requested by a user.

In various embodiments, the analytics module 218 is configured to analyze and map cited reference data stored in the matter database 204. The data may be scraped in by the input module 214. For example, cited references owned by or cited against target or other entities as mentioned above may be mapped against each other to determine a "prior art" overlap. The overlap may be presented graphically, for example in a graphic user interface presented in user terminal 104. In various embodiments, the overlap may relate to so-called "forward" citations, or "reverse" citations, or both. In various embodiments, the overlap may be presented for a target company and one or more competitors. Changes in the overlap over time may also be stored and mapped to give an indication to a user of technology trends, changes in trends and the ongoing development of potentially relevant prior art. In various embodiments, a prior art overlap between a target and competitor may be stored, mapped and shown for a single patent, a portfolio of patents, or a family of patents.

The target and other entities of interest, such as competitor companies or inventors, may be selected by the user.

An analytical result or mapping may be displayed as a list of prior art cited against both the target and competitor, with an indication of which art overlaps or is common to both listings. In various embodiments, the analytical result or mapping may in addition or alternatively present a list of companies that own the prior art cited against the target and other entities. The target company may appear as an owner. The display module 212 may be configured to display the results of the mappings and overlap of cited references as a bar chart, or listings, or other graphic, in a user interface of the type shown for example in FIG. 4.

In various embodiments, the analytics module 218 is configured to receive input identifying a pool of keywords for a first patent matter in matter database 204 and associated prior art documents in matter database 204. The term keyword is intended to include individual keywords as well as a number of keywords grouped together making up a key phrase, for example. The module 218 may be further configured to perform a keyword analysis on the first patent matter and associated prior art documents based on occurrences of the keywords in the first patent matter and associated prior art documents. The analytics module 218 may be further configured to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

In various embodiments, the analytics module 218 is configured to generate for a user the patent activity profiles of one or more entities. The entities may be competitive entities to the user, or the user's employer or client. The generated activity profiles may form part of information to assist in strategic monitoring of patent portfolios. A patent activity profile may be built for a particular patent applicant or owner, or a type of owner, and then deviances from that profile may be flagged. The profile may include foreign filing patterns, US filing patterns—for example, does the owner typically file a provisional application first, followed by a PCT application, or is a US application typically filed thereafter? The profile may include information about abandonments—for example, what subject matter does an owner give up on or surrender during prosecution, or in making abandonment decisions? In various embodiments, the profile may include information about instances or circumstances in which an owner does not pay a patent annuity or renewal fee. The profile may include any of the data stored in analytics database 210 referred to above. Analytics module 218 may be configured to flag deviances from a profile and send update alerts sent to a user accordingly. For example, in conjunction with display module 212 and input module 214, analytics module 218 may present to a user an interface indicating one or more patent activity profiles for one or more patent owners for the user to select and review.

In some embodiments, a prior art date analyzer system or tool is provided. The system interacts with an external patent database, such as PAIR, to pull from PAIR priority dates based on user-selected patent matters and apply prior art rules to determine the likely effective date of the reference as a potential citation against another patent matter.

In some embodiments a prior art date analyzer system comprises a search engine (not shown, but for example part of input module 214) to retrieve data from an external patent database (for example PAIR), the data including at least one priority date for a patent matter stored in the database, and an analytics module (for example analytics module 218) configured to receive input identifying national prior art rules, analyze the retrieved data to identify criteria relevant to the rules, and to determine automatically the likely effective date of the reference. The analyzer system may further comprise a database (for example matter database 204 or analytics database 210) for storing a plurality of national prior art rules for configuring the analytics module to perform the date analysis.

The analyzer system may further comprise a display module for displaying the results of the date analysis to a user, and in some embodiments, the display module is configured to display the results to a user in a hand-held electronic or mobile device.

In some embodiments, a patent management system comprises a network 106; at least one database 116 (or any of its sub-databases 202-210) accessible on the network and storing data including at least one priority date for a patent matter stored in the database; and a server (110-118), operatively connected to the network, wherein the server includes a processor, a memory, and software operable on the processor to receive input identifying a patent matter in the database and retrieve at least one priority date for the matter from the database, receive input identifying national prior art rules, analyze the retrieved data to identify criteria relevant to the rules, and to determine automatically the likely effective date of the reference.

The tracking module 220, according to an example embodiment, maintains information related to a specific patent, group of patents, or concept. For example, the tracking module may store information related to a patent's prosecution and litigation history (such as office actions or claim amendments). In other example embodiments, the tracking module 220 may store information relating to the assignment of patent applications or patents from one assignee to another, or from an inventor to employer assignee, for example. Information of this nature may be stored by tracking module 220 for defined sets of applications or patents registered in a specified name, and within certain date ranges, for example. Update alerts (e.g., electronic mail, SMS, or similar) may be sent to a user indicating a change in ownership for a patent or patent application.

In various embodiments, the filtering module 222 is configured to filter a set of matters according to a user preference. For example, a user may activate a check box that indicates only pending matters should be shown in a user interface. Filtering module 222 may formulate an assignment query consistent with retrieving only pending matters. The results of the query (or any query) may then be shared with display module 212 where the user interface may be updated. The regular alerts may in other example embodiments be pushed to a user terminal 104, an external website, an intranet site, a PDA, smart phone, or other similar handheld device.

In various embodiments, a patent management system 102 may be provided for automatically monitoring developments in a field of prior art. The system may comprise a database for maintaining an ontology of patent concepts of the type described above, and an input module 214 for receiving a search query including a first patent concept related to the field of prior art to be monitored. In an example embodiment, a search engine (not shown) may be provided and configured to search the Internet as a function of the search query and generate a first set of search results. The search engine may be further configured to run a second search, as a function of the same search query, on a subsequent occasion to generate a second set of search results. The analytics module 218 may be configured to compare the first and second sets of search results to identify differences in the results, and the display module 212 may be configured to communicate the differences in the search results to a user.

The system may further comprising a patent matter database (e.g. matter database 204) wherein the database includes data about the patent matters and the data including a claim set for at least one patent matter and wherein the first patent concept relates to at least one feature of the claim set. In one example embodiment, the input module may be further configured to receive the search query including the first patent concept from a user who may select at least one patent concept from the stored ontology or provide a new patent concept. In another example embodiment, the mapping module 216 may be configured to automatically provide the search query including the first patent concept to the input module 214, and may be further configured to automatically select at least one patent concept from the stored ontology. The first patent concept may include at least one keyword, for example at least one keyword present in the claim set. In an example embodiment, the first patent concept may include at least one scope concept, for example at least one scope concept present in the claim set.

In various embodiments and with reference to FIG. 2, a system for managing patent matters 102 may comprise an input module 214 to scrape patent data from an external patent database 120 (such as PAIR), the data including event dates of at least one patent matter; a docket engine (not shown but may be part of analytics module 218) to docket the scraped event dates and, based on the scraped dates, to calculate response due dates for the at least one patent matter; a search engine (not shown but may be part of input module 214) to identify and download at least one document from the external patent database 120; and a mapping module 216 to associate at least one response due date with the at least one downloaded document.

The input module may scrape data including a transaction log from the external database, such as a log of office actions for at least one patent matter. The docket engine may, in some embodiments, docket response due dates including dates for filing foreign applications or prior art cross-citation. The mapping module 216 may in some embodiment associate the at least one response due date with the at least one downloaded document by embedding the at least one due date in the downloaded document. The at least one downloaded document and the at least one due date embedded in it may be in PDF, Excel or XML form. In some embodiments, the mapping module 216 may provide the response due dates in a user's Outlook calendar, for example.

In some embodiments, a patent management system comprises a network 106; at least one patent database (operations database 116, sub-databases 202-210, or external source database at USPTO PAIR, for example), accessible on the network, and storing data including event dates of at least one patent matter stored in the database, and a server (any one of 110-118), operatively connected to the network, wherein the server includes a processor, a memory, software operable on the processor to scrape patent data from the patent database, the data including event dates of at least one patent matter, docket the scraped event dates and, based on the scraped dates, calculate response due dates for the at least one patent matter, download at least one document from the external patent database, and associate at least one response due date with the at least one downloaded document.

In various embodiments, a system for generating patent prosecution analytics for as patent management system 102 comprises an input module 214 to scrape data from an external patent database 120 (such as PAIR), the data containing information about office action activity and responses thereto for at least one patent matter stored in the database; and one or more analytics modules 218 to analyze the office action activity and responses thereto to identify at least instances in which a response has resulted in allowance of at least one claim in the at least one patent matter, or at least instances in which a response has not resulted in allowance of a claim in the at least one patent matter; identify at least one Examiner or attorney associated with the instances of allowance or non-allowance; and create a prosecution profile for the Examiner or attorney based on the identified instances of allowance or non-allowance.

The one or more analytics modules 218 may identify the grounds of rejection relied upon in the office action activity for the at least one patent matter and, based on the grounds of rejection, group the instances of allowance or non-allowance in the created profile for the Examiner or attorney. In some embodiments, the one or more analytics modules 218 may generate a listing of prosecution profiles for the Examiners or attorneys, the listing comprising prosecution success rates for the Examiners or attorneys based on the number of instances of allowance or non-allowance. In further example embodiments, the one or more analytics modules may generate a listing of prosecution profiles for the Examiners or attorneys, the listing comprising prosecution success rates for the Examiners or attorneys based on the number of instances of allowance or non-allowance grouped according to the identified grounds of rejection.

In various embodiments, a patent management system comprises a network 106; at least one patent database (any one or more of databases 116, 202-210, or external database source 120) accessible on the network 106, and storing data containing information about office action activity and responses thereto for at least one patent matter stored in the database, and a server (any one or more of 110-118), operatively connected to the network 106, wherein the server includes a processor, a memory, and software operable on the processor to scrape data from the patent database, the scraped data containing information about office action activity and responses thereto for at least one patent matter stored in the database; analyze the scraped data to identify at least instances in which a response has resulted in allowance of at least one claim in the at least one patent matter, or at least instances in which a response has not resulted in allowance of a claim in the at least one patent matter; identify at least one Examiner or attorney associated with the instances of allowance or non-allowance; and create a prosecution profile for the Examiner or attorney based on the identified instances of allowance or non-allowance.

In various embodiments, a patent management system 102 has one or more hard-wired modules (any one or more of modules 212-222) to perform at least a portion of one or more of the following: download at least one patent document from an external patent database 120; apply optical character recognition to the downloaded document to provide a text-readable version of the at least one patent document; automatically apply electronic text analysis to the text-readable version to extract one or more data elements associated with a field of interest, and transmit the data elements to a user. The one or more hard-wired modules (212-222) may further be configured to embed an action date in the text-readable version of the at least one patent document.

In various embodiments, a patent management system 102 presents one or more data fields of interest to a user. The data fields may for example be any of those associated with the user interface elements described further below in relation to FIG. 4, or as described above in relation to the information processed by analytics module 218. The system 102 comprises a network 106; at least one patent database (anyone or more of 116, 202-210, or external database source 120) accessible on the network and storing data relating to one or more of the data fields of interest for at least one patent matter stored in the database, and a server (any one or more of servers 110-118), operatively connected to the network, wherein the server includes a processor, a memory, and software operable on the processor to download at least one patent document from the external patent database; apply optical character recognition to the downloaded document to provide a text-readable version of the at least one patent document; automatically apply electronic text analysis to the text-readable version to extract one or more data elements associated with a field of interest, and transmit the data elements to a user. The software may be further operable on the processor to embed an action date in the text-readable version of the at least one patent document.

In various embodiments, a patent management system 102 has a system for automatically proofing the patent specification of a granted patent issued on a patent application, the system having one or more hard-wired modules (212-222) configured to perform at least a portion of one or more of the following: scan amendments made to the patent application during prosecution; assemble the most recent claims, based on the scanned amendments, to create a test claim set of the claims; compare the test claim set to the claims as published of the issued patent; and identify any differences between the compared sets of claims and communicating the differences to a user.

The one or more hard-wired modules (212-222) may further render the specification of the patent as issued into text-readable form; automatically compare the text of the specification as filed to the text of the specification of the patent as issued; automatically identify any differences between the compared specifications; and communicate the differences to a user.

In various embodiments, a patent management system comprises a network 106, at least one patent database (an), one or more of databases 116, 202-210, or external database source 120) accessible on the network and storing the prosecution history and patent specifications as filed and as issued of at least one patent matter stored in the database, and a server (any one or more of servers 110-118) operatively connected to the network, wherein the server includes a processor, a memory, software operable on the processor to download at least portions of the file history and specification as issued of at least one patent matter stored in the patent database; scan amendments made to the patent matter during prosecution; assemble the most recent pending claims, based on the scanned amendments, to create a test claim set of the claims; compare the test claim set to the claims as published of the issued patent; and identify any differences between the compared sets of claims and communicate the differences to a user. The software ma) be further operable on the processor to render the specification of the patent as issued into text-readable form; automatically compare the text of the specification as filed to the text of the specification of the patent as issued; automatically identify any differences between the compared specifications; and communicate the differences to a user.

Some embodiments of the present inventive subject matter include methods for aspects of patent management. Block diagrams of such methods are shown in FIGS. 3A-3.

Figure 3A:
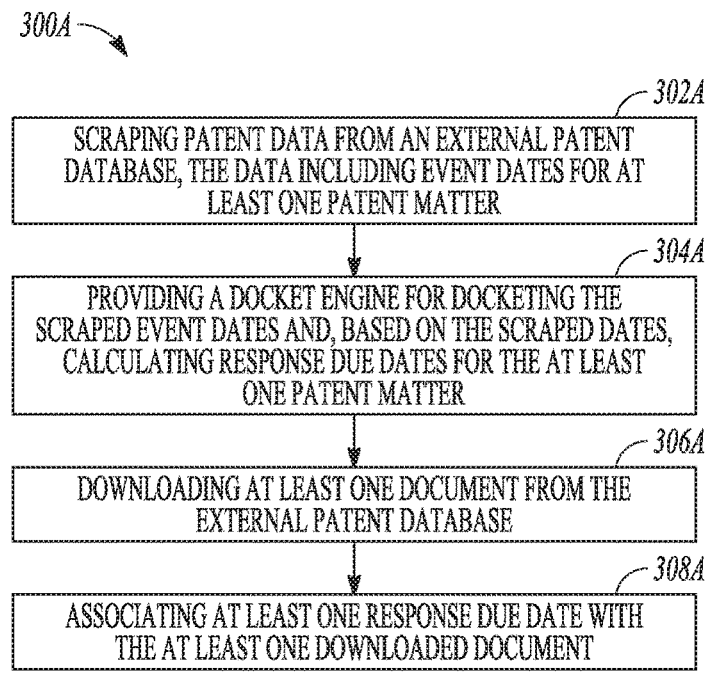
FIGS. 3A-3D are block diagrams showing methods for aspects of patent management, according to example embodiment.

One such embodiment is illustrated in FIG. 3A. A method 300A for managing patent matters comprises: at block 302A, scraping patent data from an external patent database, the data including event dates for at least one patent matter; at block 304A, providing a docket engine for docketing the scraped event dates and, based on the scraped dates, calculating response due dates for the at least one patent matter; at block 306A, downloading at least one document from the external patent database; and at block 308A, associating at least one response due date with the at least one downloaded document.

The step of scraping data may include scraping a transaction log from the external database and in some embodiments the transaction log is a log of office actions for the at least one patent matter. The response due dates may include dates for filing foreign applications or prior art cross-citation. The step of associating at least one response due date with the at least one downloaded document may include embedding the at least one due date in the downloaded document. The at least one downloaded document and the at least one due date embedded in it may be in PDF, Excel or XML form. The method 300A may include providing the response due dates in a user's Outlook calendar. The external patent database may be the USPTO database accessible via PAIR.

Figure 3B:
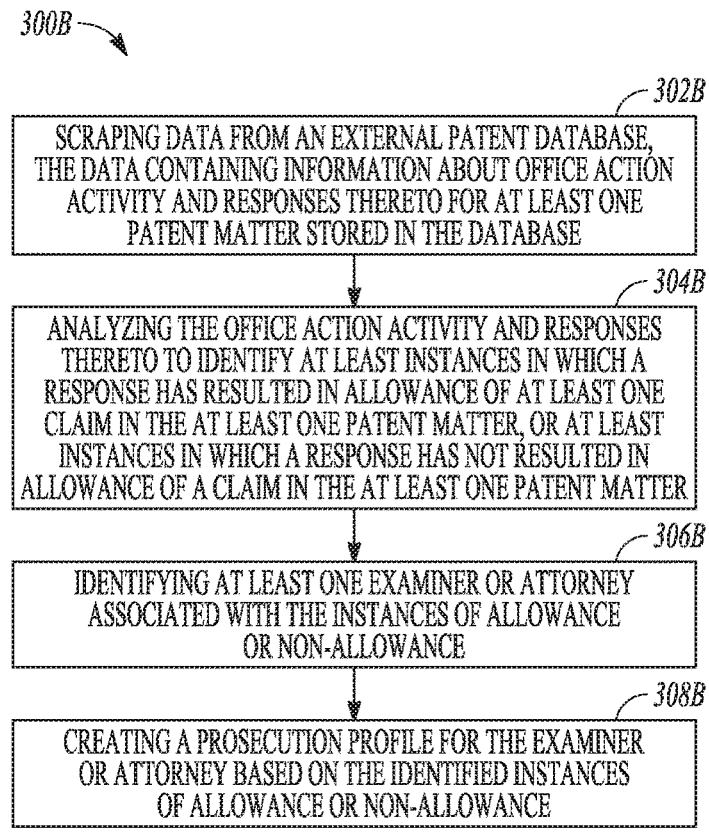

Another example method embodiment is shown in FIG. 3B. A method 300B of generating patent prosecution analytics may comprise: at block 302B scraping data from an external patent database, the data containing information about office action activity and responses thereto for at least one patent matter stored in the database; at block 304B, analyzing the office action activity and responses thereto to identify at least instances in which a response has resulted in allowance of at least one claim in the at least one patent matter, or at least instances in which a response has not resulted in allowance of a claim in the at least one patent matter; at block 306B, identifying at least one Examiner or attorney associated with the instances of allowance or non-allowance; and at block 308B creating a prosecution profile for the Examiner or attorney based on the identified instances of allowance or non-allowance.

The method 300B may further comprise identifying the grounds of rejection relied upon in the office action activity for at least one patent matter and, based on the grounds of rejection, grouping the instances of allowance or non-allowance in the created profile for the Examiner or attorney. In some embodiments, the method may further comprise generating a listing of prosecution profiles for the Examiners or attorneys, the listing comprising prosecution success rates for the Examiners or attorneys based on the number of instances of allowance or non-allowance. The success rates may be based on the number of instances of allowance or non-allowance grouped according to the identified grounds of rejection. The method may include transmitting a prosecution profile for an Examiner or attorney to a user.

Figure 3C:
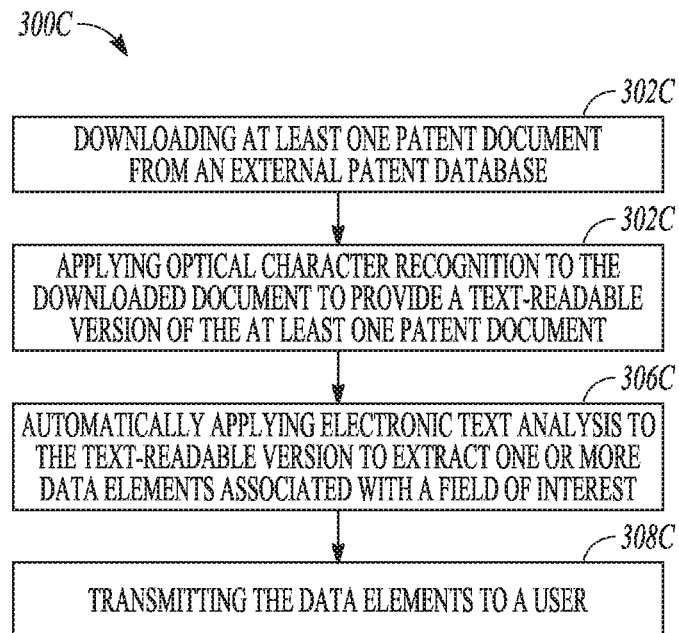

In another example embodiment shown in FIG. 3C, a method 300C of providing data for a patent management system which presents one or more data fields of interest to a user is set out in a block diagram. The method 300C may comprise: at block 302C, downloading at least one patent document from an external patent database; at block 304C, applying optical character recognition to the downloaded document to provide a text-readable version of the at least one patent document; at block 306C, automatically applying electronic text analysis to the text-readable version to extract one or more data elements associated with a field of interest; and at block 308C, transmitting the data elements to a user. In an example embodiment, the method may further comprise the step of embedding an action date in the text-readable version of the at least one patent document.

Figure 3D:
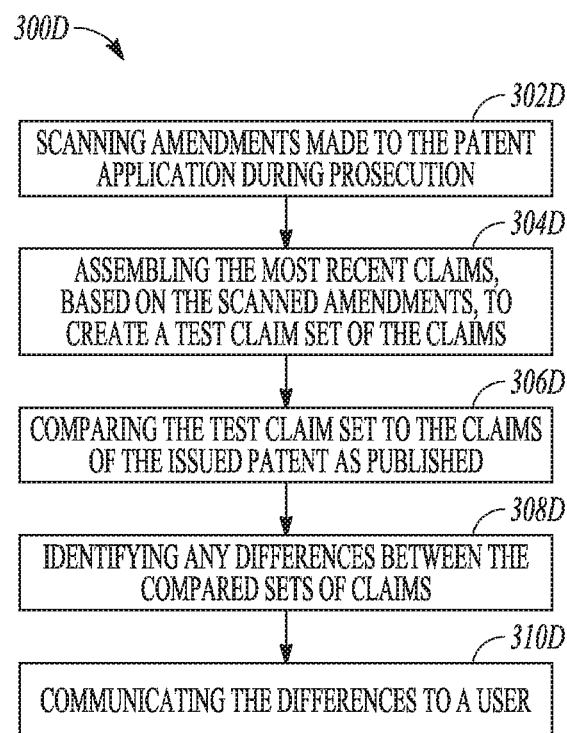

Another example method embodiment is shown in FIG. 3D. A method 300D of automatically proofing the patent specification of a granted patent issued on a patent application is provided. The method 300D comprises the steps of: at block 302D, scanning amendments made to the patent application during prosecution; at block 304D, assembling the most recent claims, based on the scanned amendments, to create a test claim set of the claims; at block 306D, comparing the test claim set to the claims of the issued patent as published; at block 308D, identifying any differences between the compared sets of claims; and at block 310D, communicating the differences to a user.

The method 300D may further comprise the steps of rendering the specification of the patent as issued into text-readable form; automatically comparing the text of the specification as filed to the text of the specification of the patent as issued; automatically identifying any differences between the compared specifications; and communicating the differences to a user.

Figure 4:
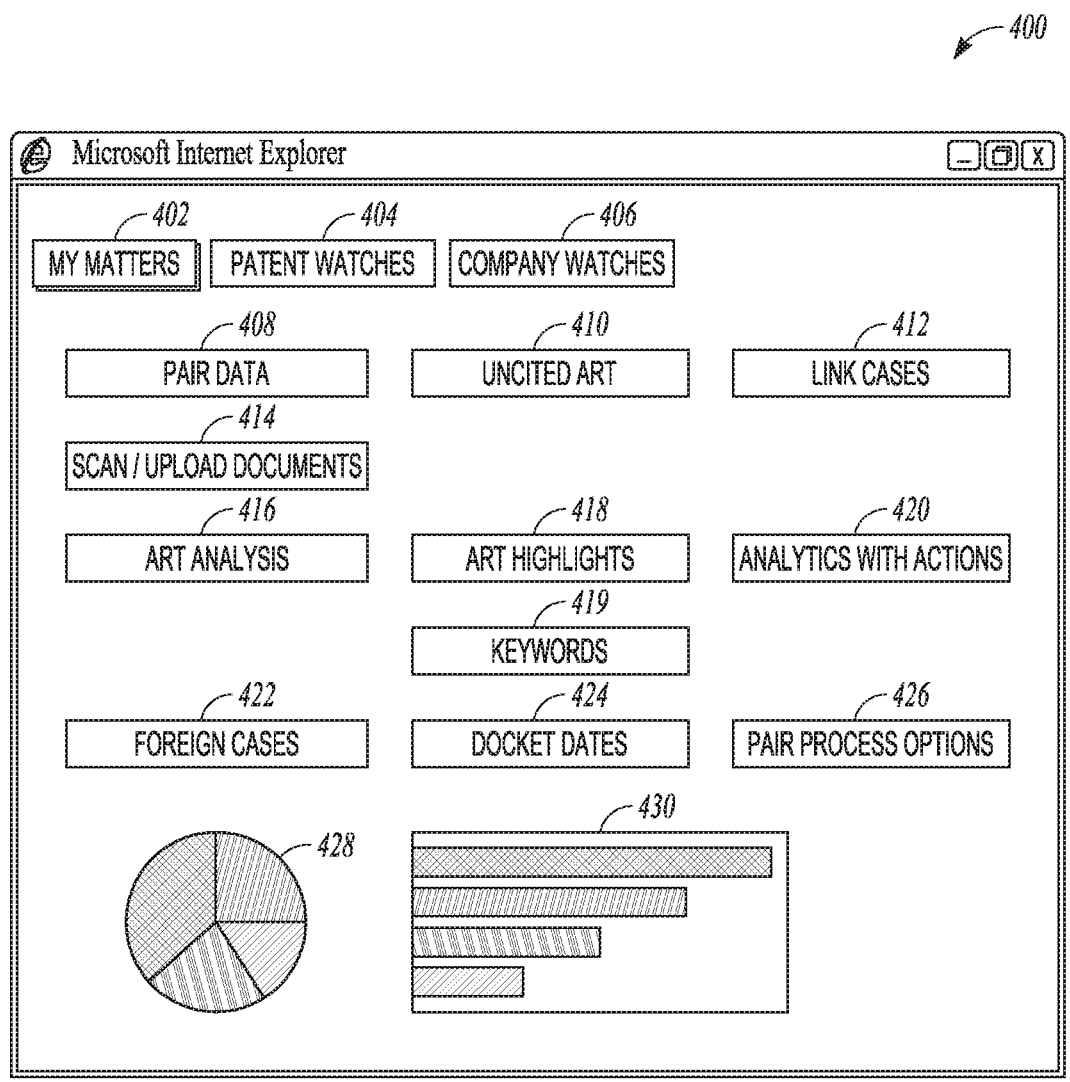
FIG. 4 is a depiction of a user interface, according to an example embodiment.

Reference is now made to FIG. 4 which shows a user interface 400 that may be used to facilitate the methods of the present inventive subject matter, according to example embodiments. The user interface 400 may be displayed by display module 212 described above. The user interface may be provided in a website, computer monitor, or mobile device. The type of user elements, names, and layout depicted in FIG. 4 are intended to be an illustration of an example user interface of patent management system 102. Other types of user elements, names, and layouts may be used.

User interface 400 is illustrated with multiple user interface elements. In an example embodiment, a user interface element is a graphical or textual element that a user may interact with to cause an application to perform an assigned action for the interface element. Data representing user interface 400 may be transmitted via network 106 and presented on a display of user terminal 104 through the use of a web browser. A user (e.g., manager of a patent portfolio etc) may interact with the user interface elements of user interface 400 through the use of an input device (e.g., stylus, cursor, mouse, a finger) of the user terminal. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIG. 4 are intended to be an illustration of an example user interface of patent management system 102. Other types of user elements, names, and layouts may be used. Some elements may be omitted in various embodiments depending on the nature of management tool provided.

In general, the user interface elements may include my matters 402, patent watches 404, and company watches 406. These elements may be used to select a context/view of the patent management system. For example, my matters 402 lists the patents included within a portfolio of a user, patent watches 404 lists information on patents that the user has indicated the patent management system is to watch, and company watches 406 lists information on companies that the user has indicated the system should watch.

In various embodiments relating to a "PAIR Plus" patent management and analytics system, the user interface 400 may have further user interface elements. The system has access to at least one patent matter database (in this case the USPTO PAIR database, although others could be used) and at least one reference database, for example a reference database stored in matter database 204. A first user interface element 408 (PAIR data) allows selection by a user of data stored in PAIR. A second user interface element 410 (Uncited Art) allows selection by a user of data stored in the at least one reference database (for example, references stored in matter database 204). User element 412 (Link cases) is a third user interface element for linking or associating at least one of the references stored in the reference database with at least one of the patent matters selected by the user from PAIR. A fourth user interface element 414 (Scan/Upload documents) allows a user to select for storage further references into the reference database. In an example embodiment, input module 214 may be used to find and load the selected document into the database 204. A fifth user interface element 416 (Art Analysis) allows a user to select analysis of at least one of the linked references. In an example embodiment, the analysis is performed by the analytics module 218. In an example embodiment, the linked reference may be a reference not previously cited by the USPTO in an Office Action issued against the patent matter. In this situation, the third user interface element 412 (Link cases) may be used to link or associate the uncited reference with the patent matter for potential citation in an information disclosure statement.

User selection of the fifth user element 416 may further provide a general analytics view of at least one patent matter or reference stored in PAIR or the database 204. A user may request further analysis by selecting user interface elements 418 (Art Highlights) and element 420 (Analytics with Actions). Using element 418 for example allows a user to view the results of a keyword analysis undertaken on at least one of the linked references. The keyword analysis may be performed by the analytics module 420 as described further above using keywords or patent concepts entered by a user in user interface element 419. Selection of element 420 may allow a user to view a list of docket dates and actions to be undertaken in response to Office Actions issued by a patent office, together with an array of views illustrating analytics of selected patent matters. The analytics may be of any type described further above in relation to modules 212 through 222 above. In various embodiments, the docket or action dates are embedded, associated with or otherwise saved with the documents uploaded into matter database 204.

In some embodiments, the general analytics view comprises a view selected from the group of views comprising: reference analysis, patent matter analysis, reference highlights, office action activity, reference submission due dates (selected by user element 424), foreign filing due dates (selected by user element 422), and patent prosecution process options (selected by user element 426). As shown in FIG. 4, the first through fifth elements (408-416) are initially provided in the same view. Pie charts 428 and bar charts 430 may be provided along with other analytical information.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
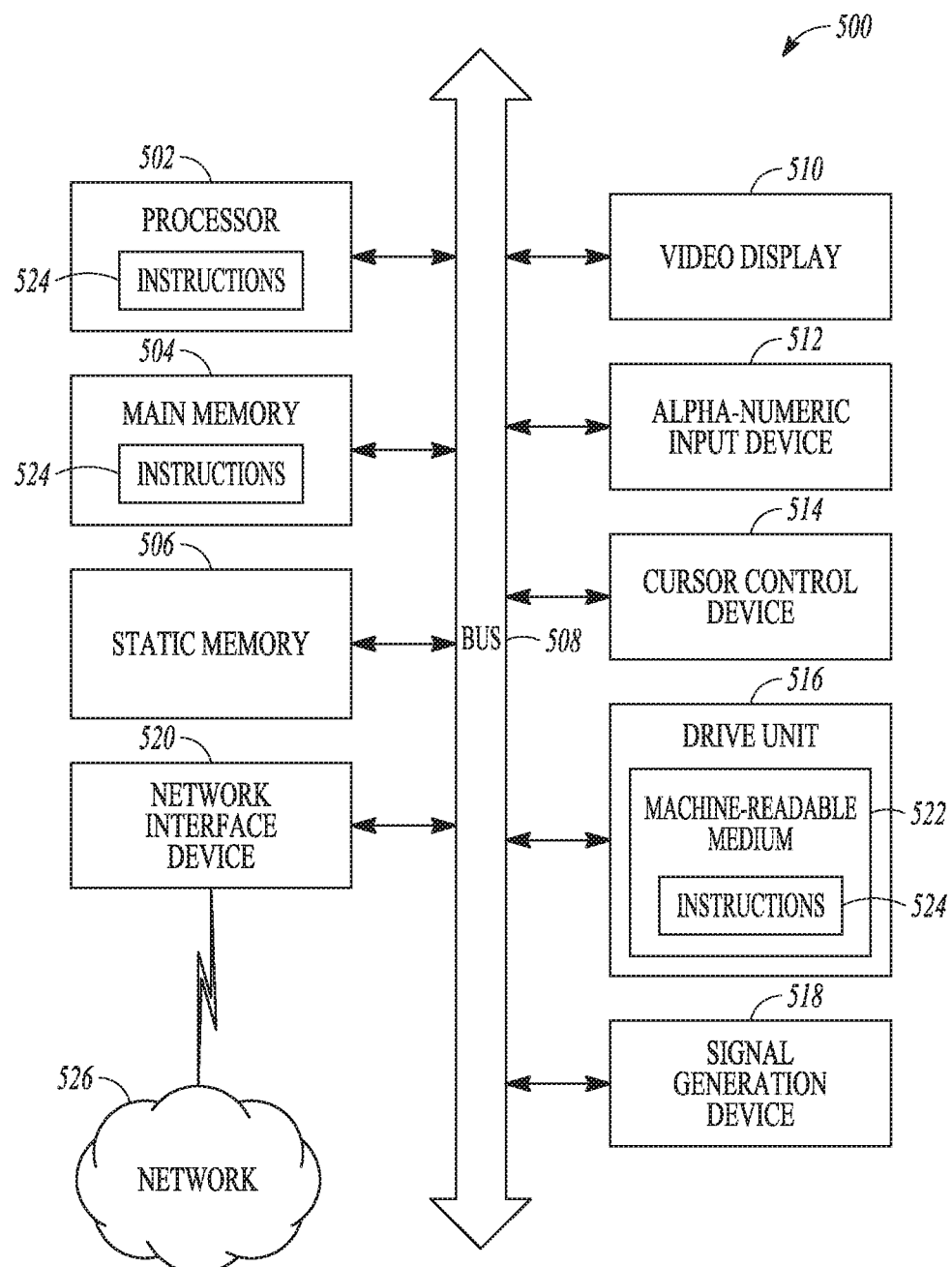
FIG. 5 is a block diagram of machine in the example form of a computer system within which a set of instructions, for causing the machine to perform any one or more of the methodologies herein discussed, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Note on the Abstract

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method to display an interactive user interface for a patent management system having access to at least one patent matter database and at least one reference database, the method comprising:
generating, for output to a display device, a single interactive user interface including a set of selectable user interface elements that upon selection present an alternate view of the single interactive user interface, the set of selectable user interface elements comprising:
a first user interface element configured to, upon selection, present a first user interface view in the single interactive user interface with patent matter selection user interface elements configured to receive a selection of data stored in the at least one patent matter database;
a second user interface element configured to, upon selection, present a second user interface view in the single interactive user interface with reference selection user interface elements configured to receive a selection of data stored in the at least one reference database;
a third user interface element configured to, upon selection, present a third user interface view in the single interactive user interface with link creation user interface elements configured to link at least one reference stored in the at least one reference database with at least one patent matter in the at least one patent matter database, wherein the patent management system manages prosecution of a patent application and the at least one reference database contains at least one reference not cited by an office action, from the at least one patent matter database, issued against the patent application and wherein the link creation user interface elements are configured, upon selection, to link the at least one reference not cited with the patent application for potential citation in an information disclosure statement;
a fourth user interface element configured to, upon selection, present a fourth user interface view in the single interactive user interface with reference storage user interface elements configured to receive a selection of references for storage in the at least one reference database; and
a fifth user interface element configured to, upon selection, present a fifth user interface view in the single interactive user interface with analytics user interface elements configured to present an analytics view of the at least one patent matter; and
updating a display window of the single interactive user interface based on selection of the first user interface element, the second user interface element, the third user interface element, the fourth user interface element, or the fifth user interface element as indicated by a match between coordinates of a user input and coordinates of the first user interface element, the second user interface element, the third user interface element, the fourth user interface element, or the fifth user interface element.

2. The method of claim 1, wherein the at least one patent matter database is a patent database of a national patent office.

3. The method of claim 1, wherein the at least one patent matter database is a United States Patent Office (USPTO) database.

4. The method of claim 1, further comprising a prior art highlights user interface element configured to present a prior art highlight view including at least one result of a keyword analysis undertaken on at least one of the linked references.

5. The method of claim 1, wherein the analytics view comprises a view selected from a group of views comprising:
reference analysis, patent matter analysis, reference highlights, office action activity, reference submission due dates, foreign filing due dates, and patent prosecution process option.

6. The method of claim 1, further comprising an analytics action user interface element configured to present an analytics action view that includes a list of docket dates and actions to be undertaken in response to one or more office actions issued by a patent office for the at least one patent matter.

7. The method of claim 6, wherein the analytics action view includes multiple views illustrating analytics for the at least one patent matter.

8. The method of claim 7, wherein the multiple views illustrating analytics for the at least one patent matter includes one or more views selected from a group of views comprising:
a pie chart including the most named inventors in a patent portfolio including the at least one patent matter; and
a bar chart displaying a number of references cited in prosecution of the at least one patent matter owned by one or more entities.

9. A system for generating and displaying an interactive user interface for a patent management system having access to at least one patent matter database and at least one reference database, the system comprising:
at least one processor; and
memory including instructions that, when executed by the at least one processor, cause the at least one processor to:
generate, for output to a display device, a single interactive user interface that includes a set of selectable user interface elements that upon selection present an alternate view of the single interactive user interface; the set of selectable user interface elements comprising:
a first user interface element configured to, upon selection, present a first user interface view in the single interactive user interface with patent matter selection user interface elements configured to receive a selection of data stored in the at least one patent matter database;
a second user interface element configured to, upon selection, present a second user interface view in the single interactive user interface with reference selection user interface elements configured to receive a selection of data stored in the at least one reference database;
a third user interface element configured to, upon selection, present a third user interface view in the single interactive user interface with link creation user interface elements configured to link at least one reference stored in the at least one reference database with at least one patent matter in the at least one patent matter database, wherein the patent management system manages prosecution of a patent application and the at least one reference database contains at least one reference not cited by an office action, from the at least one patent matter database, issued against the patent application and wherein the link user interface elements are configured, upon selection, to link the at least one reference not cited with the patent application for potential citation in an information disclosure statement;
  a fourth user interface element configured to, upon selection, present a fourth user interface view in the single interactive user interface with reference storage user interface elements configured to receive a selection of references for storage in the at least one reference database; and
  a fifth user interface element configured to, upon selection, present a fifth user interface view in the single interactive user interface with analytics user interface elements configured to present an analytics view of the at least one patent matter; and
  update a display window of the single interactive user interface based on selection of the first user interface element, the second user interface element, the third user interface element, the fourth user interface element, or the fifth user interface element as indicated by a match between coordinates of a user input and coordinates of the first user interface element, the second user interface element, the third user interface element, the fourth user interface element, or the fifth user interface element.

10. The system of claim 9, wherein the at least one patent matter database is a patent database of a national patent office.

11. The system of claim 9, wherein the at least one patent matter database is a United States Patent Office (USPTO) database.

12. The system of claim 9, further comprising a prior art highlights user interface element configured to present a prior art highlight view including at least one result of a keyword analysis undertaken on at least one of the linked references.

13. The system of claim 9, wherein the analytics view comprises a view selected from a group of views comprising:
  reference analysis, patent matter analysis, reference highlights, office action activity, reference submission due dates, foreign filing due dates, and patent prosecution process option.

14. The system of claim 9, further comprising an analytics action user interface element configured to present an analytics action view that includes a list of docket dates and actions to be undertaken in response to one or more office actions issued by a patent office for the at least one patent matter.

15. The system of claim 14, wherein the analytics action view includes multiple views illustrating analytics for the at least one patent matter.

16. The system of claim 15, wherein the multiple views illustrating analytics for the at least one patent matter includes one or more views selected from a group of views comprising:
  a pie chart including the most named inventors in a patent portfolio including the at least one patent matter; and
  a bar chart displaying a number of references cited in prosecution of the at least one patent matter owned by one or more entities.

17. At least one non-transitory machine readable medium including instructions for generating and displaying an interactive user interface for a patent management system having access to at least one patent matter database and at least one reference database that, when executed by at least one processor, cause the at least one processor to:
  generate, for output to a display device, a single interactive user interface that includes a set of selectable user interface elements that upon selection present an alternate view of the single interactive user interface, the set of selectable user interface elements comprising:
    a first user interface element configured to, upon selection, present a first user interface view in the single interactive user interface with patent matter selection user interface elements configured to receive a selection of data stored in the at least one patent matter database;
    a second user interface element configured to, upon selection, present a second user interface view in the single interactive user interface with reference selection user interface elements configured to receive a selection of data stored in the at least one reference database;
    a third user interface element configured to, upon selection, present a third user interface view in the single interactive user interface with link creation user interface elements configured to link at least one reference stored in the at least one reference database with at least one patent matter in the at least one patent matter database wherein the patent management system manages prosecution of a patent application and the at least one reference database contains at least one reference not cited by an office action from the at least one patent matter database, issued against the patent application and wherein the link creation user interface elements are configured, upon selection, to link the at least one reference not cited with the patent application for potential citation in an information disclosure statement;
    a fourth user interface element configured to, upon selection, present a fourth user interface view in the single interactive user interface with reference storage user interface elements configured to receive a selection of references for storage in the at least one reference database; and
    a fifth user interface element configured to, upon selection, present a fifth user interface view in the single interactive user interface with analytics user interface elements configured to present an analytics view of the at least one patent matter; and
  update a display window of the single interactive user interface based on selection of the first user interface element, the second user interface element, the third user interface element, the fourth user interface element, or the fifth user interface element as indicated by a match between coordinates of a user input and coordinates of the first user interface element, the second user interface element, the third user interface element, the fourth user interface element, or the fifth user interface element.

18. The at least one non-transitory machine readable medium of claim 17, wherein the at least one patent matter database is a patent database of a national patent office.

19. The at least one non-transitory machine readable medium of claim 17, wherein the at least one patent matter database is a United States Patent Office (USPTO) database.

20. The at least one non-transitory machine readable medium of claim 17, further comprising a prior art highlights user interface element configured to present a prior art highlight view including at least one result of a keyword analysis undertaken on at least one of the linked references.

21. The at least one non-transitory machine readable medium of claim 17, wherein the analytics view comprises a view selected from a group of views comprising:
reference analysis, patent matter analysis, reference highlights, office action activity, reference submission due dates, foreign filing due dates, and patent prosecution process option.

* * * * *

UNITED STATES PATENT AND TRADEMARK OFFICE
CERTIFICATE OF CORRECTION

PATENT NO. : 11,086,886 B2  Page 1 of 1
APPLICATION NO. : 15/912553
DATED : August 10, 2021
INVENTOR(S) : Steven W. Lundberg It is certified that error appears in the above-identified patent and that said Letters Patent is hereby corrected as shown below:

In the Claims

In Column 24, Line 45, in Claim 9, delete "interface;" and insert --interface,-- therefor In Column 25, Line 5, in Claim 9, after "link", insert --creation--

In Column 26, Line 28, in Claim 17, after "database", insert --,--

In Column 26, Line 32, in Claim 17, after "action", insert --,--

Signed and Sealed this
Fourth Day of January, 2022

Drew Hirshfeld
*Performing the Functions and Duties of the
Under Secretary of Commerce for Intellectual Property and
Director of the United States Patent and Trademark Office*